(12) United States Patent
Knox (10) Patent No.: US 9,758,073 B2
(45) Date of Patent: Sep. 12, 2017

(54) VARIABLE GAIN CONTROL IN ROLL COMPENSATING SEAT

(71) Applicant: BOSE CORPORATION, Framingham, MA (US)

(72) Inventor: Lawrence D. Knox, Hopkinton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 14/934,474

(22) Filed: Nov. 6, 2015

(65) Prior Publication Data

US 2017/0129371 A1    May 11, 2017

(51) Int. Cl.
*B60N 2/39* (2006.01)
*B60N 2/10* (2006.01)
B60N 2/50 (2006.01)

(52) U.S. Cl.
CPC  *B60N 2/39* (2013.01); *B60N 2/10* (2013.01)

(58) Field of Classification Search
CPC ... B60N 2/39; B60N 2/10; B60N 2/50; B60G 17/018
USPC .............. 701/49, 45, 37; 296/65.05
See application file for complete search history.

(56) References Cited

U.S. PATENT DOCUMENTS 6,637,816 B2 * 10/2003 Pavlov ................. B60N 2/0232
297/216.1
8,095,268 B2   1/2012 Parison et al.
2001/0037169 A1  11/2001 Clair
2004/0089488 A1 *  5/2004 Bremner ................. B60N 2/002
180/89.13
2006/0261647 A1 * 11/2006 Maas .................... B60N 2/0244
297/216.1
2007/0260383 A1  11/2007 Sundaram et al.
2008/0255734 A1  10/2008 Altshuller et al.
2011/0172886 A1 *  7/2011 Taira ........................ A61G 5/04
701/49

(Continued)

FOREIGN PATENT DOCUMENTS

GB    2313214 A    11/1997
WO    9728981 A1    8/1997
WO    0183261 A1    11/2001

OTHER PUBLICATIONS

International Search Report and Written Opinion for application No. PCT/US2016/060086 dated Mar. 24, 2017.

*Primary Examiner* — Tan Q Nguyen
(74) *Attorney, Agent, or Firm* — Lando & Anastasi, LLP (57) ABSTRACT

Systems and methods for actively isolating a payload from a disturbance. In one example, a seat system for a vehicle includes a seat, a support structure including an actuator configured to move the seat about a pivot axis at a command angle, a sensor positioned to detect vehicle movement, and a controller configured to determine a vehicle roll angle based on an input from the sensor, generate a variable gain based at least on a vehicle roll acceleration determined from the input, wherein the variable gain modulates a gain of a band-pass filter having a fixed bandwidth, generate a command signal based at least on the vehicle roll angle, the controller configured to adjust a magnitude of the command signal relative to an amplitude of the input and apply the band-pass filter, and provide a force command to the actuator to move the seat at a desired command angle.

27 Claims, 6 Drawing Sheets

(56) References Cited

U.S. PATENT DOCUMENTS

| | | | |
|---|---|---|---|
| 2013/0131923 A1* | 5/2013 | Tzipman | B62D 24/04 |
| | | | 701/38 |
| 2014/0316661 A1 | 10/2014 | Parker et al. | |
| 2014/0358378 A1* | 12/2014 | Howard | B60N 2/501 |
| | | | 701/45 |
| 2015/0081171 A1 | 3/2015 | Ericksen et al. | |
| 2016/0101664 A1 | 4/2016 | Richter | |

* cited by examiner

VARIABLE GAIN CONTROL IN ROLL COMPENSATING SEAT

TECHNICAL FIELD

Aspects and implementations of the present disclosure are directed generally to payload suspension, and in some examples, more specifically to vehicle seats and methods for vehicle roll compensation.

BACKGROUND

In a Cartesian coordinate system (X, Y, and Z directions) a payload held by a supporting platform may be subject to motion in various directions. For example, an occupant positioned upon a vehicle seat, an occupant positioned within a wheelchair, or an occupant located within a neonatal incubator, may be subject to motion in up to six directions of freedom, including rotation and translation about each of a roll, pitch, and yaw axis. Due to uneven earth surfaces, the payload often experiences disturbances when a vehicle attached to the supporting platform encounters obstructions. In particular, disturbances as a result of surface conditions can be especially dramatic when the supporting platform includes a rigid or stiff suspension system, such as those typically found in tractors and other heavy machinery.

SUMMARY

In accordance with aspects of the present disclosure, there are provided systems and methods for actively isolating a payload from a disturbance. For example, there are provided a vehicle seat, a seat system for a vehicle, and methods for controlling seat movement in a vehicle. In one example, the seat system includes a seat positioned at a command angle relative to substantially horizontal orientation, and a controller configured to generate a command signal to instruct an actuator coupled to the seat to adjust the command angle to compensate for movement of the vehicle during a disturbance, such as a vehicle roll or pitch event. In particular, several aspects of the present disclosure adjust a magnitude of the command signal relative to an amplitude of the disturbance. Accordingly, several aspects and implementations prevent movement of the seat in response to noise within the system. Further, aspects and implementations permit a user or operator to adjust a sensitivity of the seat or system to vehicle roll or pitch events. While various aspects and implementations are described herein with reference to a vehicle seat or a vehicle seat system, further aspects and implementations may include other platforms systems for supporting a payload sensitive to disturbance, such as wheelchairs, gurneys, beds, neonatal incubators, and heavy machinery.

According to one aspect, provided is a method of controlling seat movement in a vehicle. In one example, the method may include receiving an input from at least one sensor positioned to measure movement of the vehicle, determining a vehicle roll angle based at least in part on the input, generating a variable gain based at least in part on a vehicle roll acceleration determined from the input, wherein the variable gain modulates a gain of a band-pass filter having a fixed bandwidth, generating a command signal based at least in part on the vehicle roll angle, including adjusting a magnitude of the command signal relative to an amplitude of the input, wherein generating the input includes applying the band-pass filter, and providing a force command to the actuator to move the seat about a first axis of a pivot at a command angle based on at least the command signal.

In one example, receiving an input from at least one sensor includes receiving a vehicle roll rate from a sensor positioned to measure rotation of the vehicle about a second axis extending parallel to a direction of travel of the vehicle. According to a further example, generating a command signal includes multiplying the variable gain and the vehicle roll angle. In one example, generating the variable gain includes differentiating the vehicle roll rate to determine the vehicle roll acceleration. According to one example, generating the variable gain includes normalizing the roll acceleration within a range of substantially 0.0 to 1.0, and the variable gain is set to a maximum value if the roll acceleration is greater than an upper threshold, the variable gain is set to a minimum value if the roll acceleration is less than a lower threshold, and the variable gain is linearly interpolated between the maximum value and the minimum value if the roll acceleration is equal to or between the upper threshold and the lower threshold.

According to one example, generating the command signal includes applying a pre-multiply compensator to the vehicle roll angle and applying a post-multiply compensator to the vehicle roll angle. In a further example, the pre-multiply compensator and post-multiply compensator include perfect compliments. In one example, generating a variable gain based at least in part on a vehicle roll acceleration determined from the input includes band-pass filtering the input with a sensitivity band-pass filter having bandwidth of payload sensitive frequencies. According to one example, generating the variable gain includes applying a gain multiplier to the vehicle roll rate.

According to one aspect, provided is seat system for a vehicle. In one example, the seat system for a vehicle may include a seat, a support structure coupled to the seat and including an actuator configured to move the seat about a first axis of a pivot at a command angle, at least one sensor positioned to detect movement of the vehicle, and a controller configured to receive an input from the at least one sensor, determine a vehicle roll angle based at least in part on the input, generate a variable gain based at least in part on a vehicle roll acceleration determined from the input, wherein the variable gain modulates a gain of a band-pass filter having a fixed bandwidth, generate a command signal based at least in part on the vehicle roll angle, the controller being configured to adjust a magnitude of the command signal relative to an amplitude of the input and apply the band-pass filter, and provide a force command to the actuator to move the seat at a desired command angle based on the command signal.

In one example, the sensor is positioned to measure movement of the vehicle about a second axis extending parallel to a direction of travel of the vehicle, and the input includes a vehicle roll rate. According to an example, the seat system is further configured to generate the command signal by multiplying the variable gain and the vehicle roll angle. In one example, the controller is configured to differentiate the vehicle roll rate to determine the vehicle roll acceleration. In a further example, the controller is configured to normalize the roll acceleration within a range of substantially 0.0 to 1.0, and further configured to set the variable gain to a maximum value if the roll acceleration is greater than an upper threshold, set the variable gain to a minimum value if the roll acceleration is less than a lower threshold, and linearly interpolate the variable gain between the maximum value and the minimum value if the roll acceleration is equal to or between the upper threshold and the lower threshold.

According to one example, the controller is further configured to apply a pre-multiply compensator to the vehicle roll angle and a post-multiply compensator to the vehicle roll angle. In a further example, the pre-multiply compensator and post-multiply compensator include perfect compliments. In one example, the controller is configured to band-pass filter the input with a sensitivity band-pass filter having a band-pass of payload sensitive frequencies. According to one example, the controller is further configured to apply a gain multiplier to the vehicle roll rate.

According to another aspect, provided is a vehicle seat. In one example, the vehicle seat may include a seat configured to move at a command angle about a first axis of a pivot relative to a substantially horizontal orientation, and a controller configured to receive an input of detected movement of the vehicle, determine a vehicle roll angle based at least in part on the input, generate a variable gain based at least in part on a vehicle roll acceleration determined from the input, wherein the variable gain modulates a gain of a band-pass filter having a fixed bandwidth, generate a command signal based at least in part on the vehicle roll angle, the controller being configured to adjust a magnitude of the command signal relative to an amplitude of the input and apply the band-pass filter, and provide a force command to the actuator to move the seat at a desired command angle based on at least the command signal.

In one example, the input includes a vehicle roll rate. In a further example, the controller is configured to generate the command signal by multiplying the variable gain and the vehicle roll angle. According to one example, the controller is configured to differentiate the vehicle roll rate to determine the vehicle roll acceleration. In one example, the controller is configured to normalize the roll acceleration within a range of substantially 0.0 to 1.0, and further configured to set the variable gain to a maximum value if the roll acceleration is greater than an upper threshold, set the variable gain to a minimum value of the roll acceleration is less than a lower threshold, and linearly interpolate the variable gain between the maximum value and the minimum value if the roll acceleration is equal to or between the upper threshold and the lower threshold.

According to one example, the controller is further configured to apply a pre-multiply compensator to the vehicle roll angle and a post-multiply compensator to the vehicle roll angle. In a further example, the pre-multiply compensator and post-multiply compensator include perfect compliments. In one example, the controller is configured to band-pass filter the input with a sensitivity filter having a bandwidth of payload sensitive frequencies. According to an example, wherein the controller is further configured to apply a gain multiplier to the vehicle roll rate.

Still other aspects, examples, and advantages of these exemplary aspects are discussed in detail below. Further implementations may include means for performing any of the processes recited herein. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

DETAILED DESCRIPTION

Aspects and implementations disclosed herein are not limited to the details of construction and the arrangement of components set forth in the following description or illustrated in the drawings. Aspects and implementations disclosed herein are capable of being practiced or of being carried out in various ways.

Several aspects and implementations discussed herein are generally related to systems and methods for actively isolating a payload supported by a platform from a disturbance. While described primarily within the context of an occupant supported by a vehicle seat, or vehicle seat system, other implementations may include wheelchairs, gurneys, beds, neonatal incubators, heavy machinery, and any other systems or apparatuses capable of actively isolating a payload from a disturbance. In at least one example, a vehicle seat system includes a seat and a controller for controlling rotation of the seat during roll or pitch events of an associated vehicle. In particular, during vehicle roll or pitch events, the system actively controls a roll (and/or pitch) of the seat by generating a command signal and issuing a force command to an actuator coupled to the seat. The actuator can induce roll (and/or pitch) into the seat, or a support structure attached to the seat, to compensate for the roll or pitch of the vehicle. Particular implementations of the controller may adjust a magnitude of the command signal relative to an amplitude of the vehicle roll or pitch event, and permit a user or operator to adjust a sensitivity of the seat or system to disturbances. As such, various aspects and implementations improve the comfort and safety of traditional payload suspension systems.

Figure 1A:
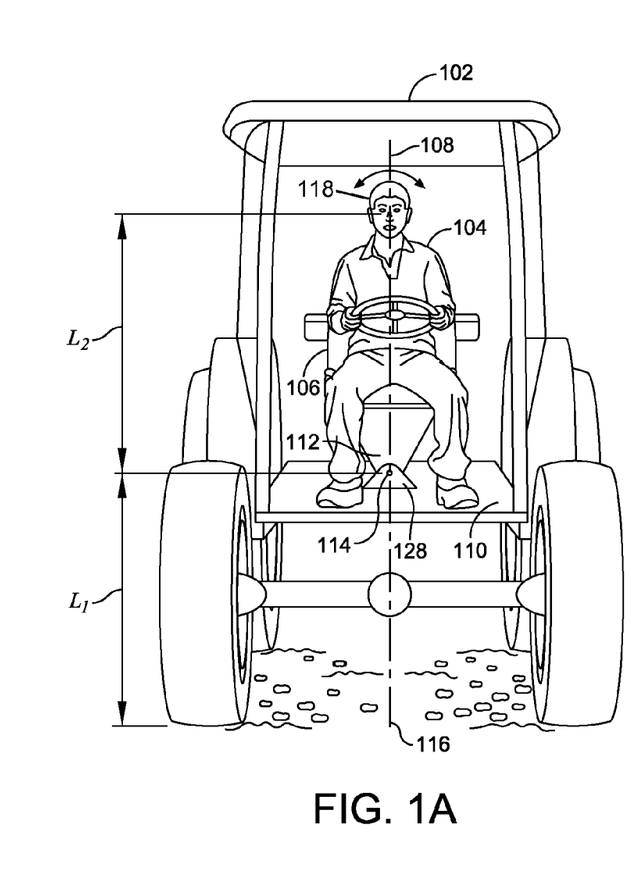
FIG. 1A is an illustration of a vehicle.
Figure 1B:
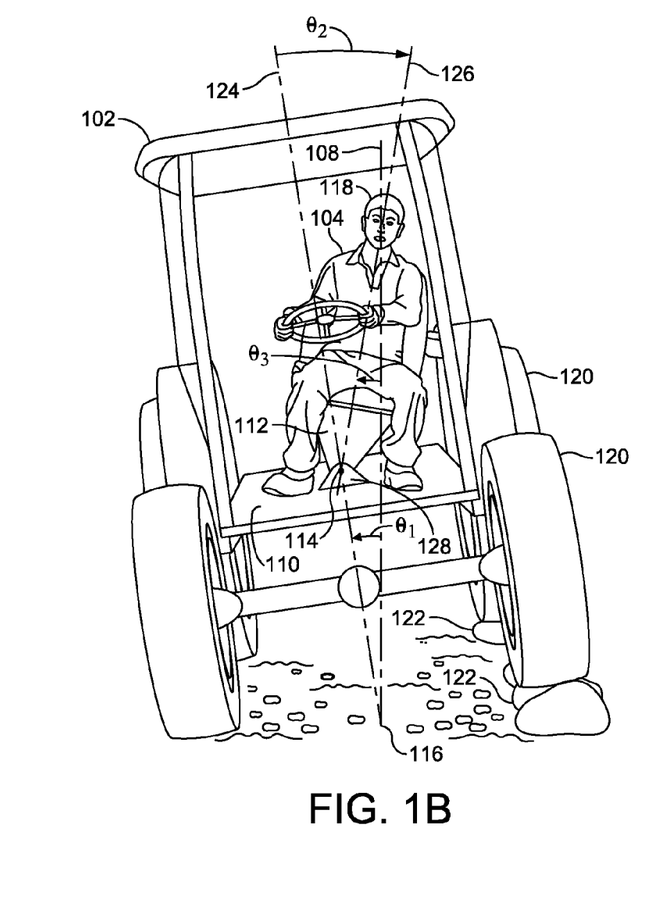
FIG. 1B is an illustration of the vehicle of FIG. 1A experiencing a roll event.

Several examples discussed herein include a vehicle seat and a seat system for a vehicle. FIGS. 1A and 1B illustrate an example seat and seat system for a vehicle according to several implementations. In particular, FIG. 1A shows a vehicle 102 in the form of a tractor traveling on a substantially level surface, and FIG. 1B shows the tractor 102 encountering a roll event at a vehicle roll angle of $\theta_1$. It is appreciated that portions of the tractor 102 shown in FIGS. 1A and 1B have been omitted to facilitate description of various implementations. In FIGS. 1A and 1B, a person 104 is shown sitting in the seat 106 in a substantially vertical orientation along an imaginary reference vertical centerline 108 which passes through the body of the person 104 who is sitting in the seat 106. In this example, the vertical centerline 108 bisects the person 104 and the seat 106 when both the seat 106 and the vehicle 102 are in a nominal, level horizontal orientation as shown in FIG. 1A. This is because the seat 106 is substantially symmetrical as viewed in FIG. 1A. In other types of vehicles, the seat 106 may be located to the left or right of the vertical centerline 108.

The seat 106 is secured to the floor 110 of the vehicle via a support structure 112. The support structure 112 includes a pivot 128 which permits the seat 106 to move/rotate relative to the vehicle 102 about a first axis 114 which is substantially parallel to a direction in which the vehicle 102 is moving when the vehicle 102 is moving in a straight line. FIGS. 1A and 1B show the axis 114 of the pivot 128 located at a distance below the seat 106, and in various implementations the axis 114 may be located higher or lower than shown. The axis 114 is fixed relative to the vehicle 102. In various implementations the vehicle 102 may roll about a second axis 116 which is substantially parallel with the first axis 114 and the direction in which the vehicle 102 is moving.

As shown in FIGS. 1A and 1B, a distance L1 represents the length between the first axis 114 and the second axis 116. A second distance, L2, represents the length between the first axis 114 and a substantially center virtual point of the payload (e.g., a center of a head 118 of the occupant 104 of the vehicle 102). In various implementations, the top end of L2 will reside at or above a position associated with the head of a person sitting in the seat, and for example, may be in a range of 3-5 feet.

In FIG. 1B, the left tires 120 of the vehicle 102 have hit an obstruction 122 in the surface over which the vehicle 102 is traveling, causing the vehicle 102 to rotate counter-clockwise (when viewed from the front). Rotation about the axis 116 is an approximation for the rotation of the vehicle 102 about the bottom of the right tires and is used for symmetry. The vehicle 102 has approximately rotated by the vehicle roll angle $\theta_1$, which represents the angle between the vertical centerline 108 and a vehicle centerline 124. If the seat 102 is not positioned at the center of the vehicle 102 (i.e., positioned to one or the other side of the center), then $\theta_1$ is determined by the rotation of the vehicle centerline 124 from the nominal position in FIG. 1A to a rotated position (e.g., in FIG. 1B). In several implementations, when the vehicle 102 rotates counter-clockwise the seat 106 is rotated about the axis 114 clockwise (opposite the direction of roll of the vehicle 102). The seat 106 may be rotated by an actuator coupled to the support structure 112. Similarly, when the vehicle 102 rotates clockwise the seat 106 is rotated about the axis 114 counter-clockwise. In both implementations, a controller in communication with at least the actuator provides a force command to cause the actuator to rotate the seat by the angle $\theta_2$, which is the angle between the vehicle centerline 124 and a seat centerline 126 (i.e., a substantially horizontal orientation).

In various implementations, the angle $\theta_2$ is determined by the controller according to: $\theta_2, \theta_1*(1+L_1/L_2)$. In some implementations, locating the axis 114 close to the floor 110 is preferable because $\theta_2$ increases when $L_1$ increases relative to $L_2$. Accordingly, larger rotations would be required to compensate for a fixed amount of roll if the height of the axis 114 is increased from the floor 110. As a result, the person 104 is rotated about a position to substantially reduce or minimize side-to side and/or front/back movement. In various implementations, the head 118 of the occupant remains substantially on the original vertical centerline 108. Further systems and methods for reducing acceleration of an occupant's head in a horizontal direction due to disturbances in road surface may be done by employing the techniques described in U.S. Pub. No. 2014/0316661, titled "SEAT SYSTEM FOR A VEHICLE," which is hereby incorporated by reference herein in its entirety.

Figure 2:
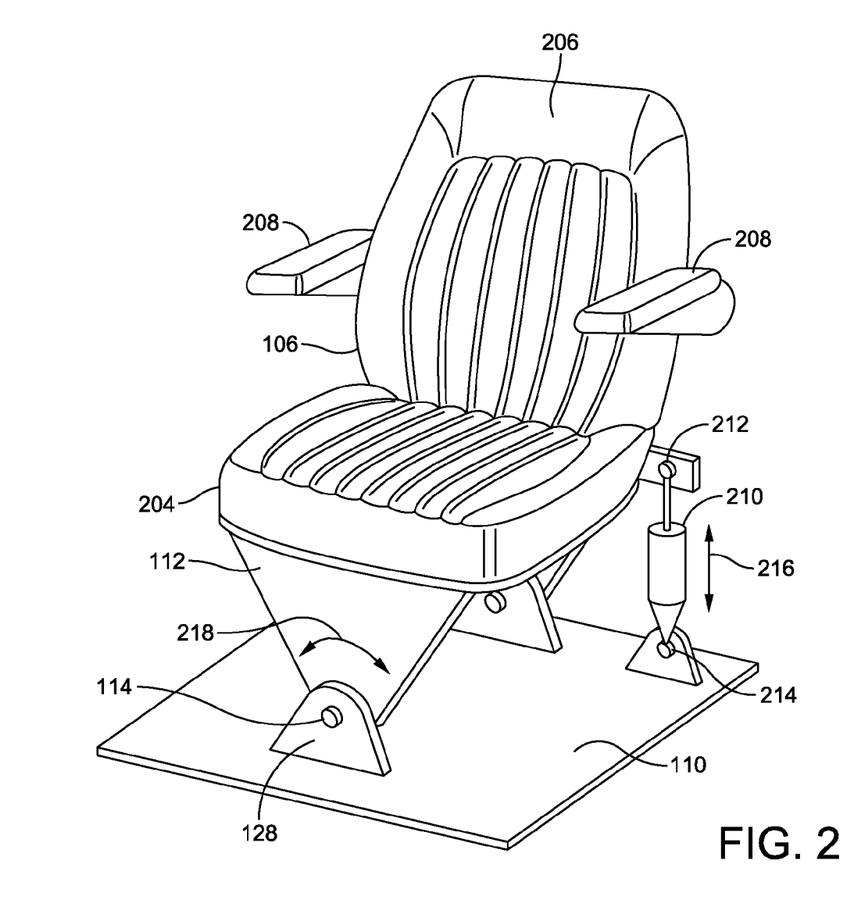
FIG. 2 is an illustration of an example vehicle seat and vehicle seat system according to various aspects discussed herein.

Turning now to FIG. 2 with continuing reference to FIGS. 1A-1B, shown is one example of a vehicle seat system including a vehicle seat, such as vehicle seat 106 shown in FIGS. 1A and 1B. The seat 106 is shown with a bottom 204 and a seat back 206 which is connected to the bottom 204. A pair of arms 208 extends forward from the seat back 206. An advantage of this seat system is that any impact of the arms 208 against a torso of the person 104 due to side-to-side rocking of the vehicle 102 will be substantially reduced (or minimized). A similar improvement will occur on the seat back 206 whereby the lateral translation of the seat back 206 relative to a person's back will also be substantially reduced. A linear actuator 210 is pivotally connected to the support structure 112 (at a location 212) and can interact with the seat 106 to cause the seat 106 to rotate about the axis 114. In this example, the linear actuator 210 is also pivotally connected to the floor 110 of the vehicle at a location 214. The linear actuator 210 is extended or retracted in the direction of a two-headed arrow 216 to cause the seat 106 to rotate about the axis 114 in the direction of a two-headed arrow 218. The linear actuator 210 can be, for example, an electromagnetic linear motor, a hydraulic cylinder, or a pneumatic cylinder. The linear actuator 210 instead can be some other type of actuator such as a rotary actuator (electromagnetic, hydraulic, or pneumatically powered) that is coupled between the seat 106 and the floor 110. Any type of actuator can be directly coupled to the seat 106 or it may act through some type of gear train, linkages or other transmission mechanism. The actuator 210 can be connected to a different portion of the support structure 112, or seat 106, and a different portion of the vehicle 102 (other than the floor 110, e.g. a wall of the driver compartment). Control of the actuator 210 is further discussed below with reference to at least FIGS. 3-5.

The seat 106 is shown with only a single degree of freedom about the axis 114 (a roll axis) relative to the vehicle 102. This single degree of freedom could instead be about a pitch axis, a yaw axis, or about a plurality of axes (i.e., roll, pitch, and/or yaw). In this case, the axis 114 is oriented front-to-back as viewed in FIG. 1A and allows the seat 106 to be controlled for side to side rolling. In another example, the seat 106 may be outfitted with one or more additional actuators (not shown) to provide movement of the seat 106 in one or more additional degrees of freedom. For example, instead of mounting the intermediate support structure 112 to the floor 110, the intermediate support structure 112 can be mounted to a platform (not shown) which is moved up and down in the vertical direction by an additional actuator to reduce the vertical vibrations felt by the driver as the vehicle travels over a road (or this vertical actuator can be interposed between the structure and the seat). An example of this type of vertical active suspension system is shown in U.S. Pat. No. 8,095,268, titled "ACTIVE SUSPENDING", which is incorporated herein by reference in its entirety. The vertical active suspension system can be operated independently of the rotating seat 106. The $L_2$ distance (FIGS. 1A and 1B) will vary with the motions associated with a vertical isolation mechanism. This effect can be included in the processor calculations based on inputs from a sensor which detects a distance between the platform and the floor. In addition, the vertical isolation system can be used to offset any potential raising or lowering of the head of the person due to the combined rotation of the vehicle (e.g., relative to the ground), and rotation of the seat relative to the vehicle.

Figure 3:
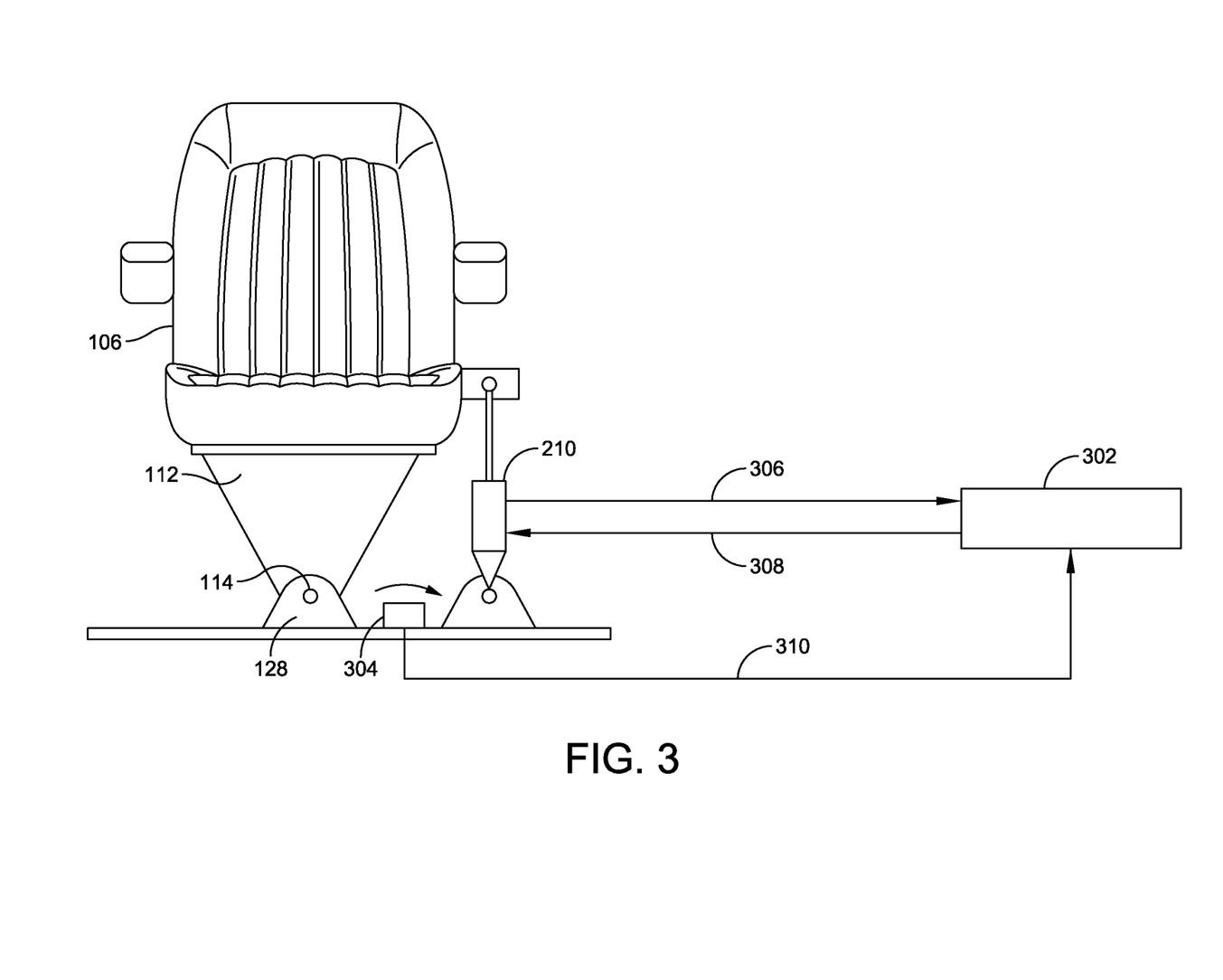
FIG. 3 is a further illustration of an example vehicle seat and vehicle seat system according to various aspects discussed herein.

Turning to FIG. 3, operation of the actuator 210 is controlled by a controller 302. A sensor 304 can measure an aspect of motion which in this example is a roll rate of the vehicle. The controller 302 receives an input from the sensor 304 in the form of roll rate data via a bus 310. In various examples, the sensor 304 includes a roll rate gyroscope. In various other examples, the input from the sensor 304 includes a component of a vehicle roll rate, and the controller 302 is configured to calculate the vehicle roll rate based on at least the component of the vehicle roll rate. The controller 302 calculates the integral of the roll rate data to determine an instantaneous vehicle roll angle $\theta_1$ (FIG. 1B). The controller 302 then uses $\theta_1$ in the equation given above along with $L_2$ and $L_1$, and generates a command signal including the instantaneous command angle $\theta_2$ (FIG. 1B). Next, the controller 302 uses a look-up table to determine the desired actuator position in order to achieve the calculated $\theta_2$. The actuator position look-up table (and other look-up tables discussed herein, such as the maximum command angle look-up table and attenuation look-up table discussed below) may include any array that replaces a runtime computation with an indexing operation. For example, the actuator position look-up table may include an array of pre-calculated and indexed actuator positions stored in static program storage. Note that the controller 302 receives position data from the actuator 210 via a bus 306. The position data is indicative of a position of the actuator 210 which is correlated to a position of the seat 106 about the axis 114. As such, the controller 302 is informed of the current position (e.g., displacement) of the actuator 210 when generating the command signal. It should be noted that various control laws such as PI, PID, or other known control laws may be used.

The controller 302 then issues a force command to the actuator 210 via a bus 308 which causes the actuator 210 to move to the desired actuator position. By successively repeating these steps, the controller 302 utilizes input from the sensor 304 to determine a desired motion of the seat 106 about the axis 114, and then operates the actuator 210 to cause the desired motion of the seat 106 about that axis. This results in a substantial reduction (or minimizing) of the acceleration of a person's head sitting in the seat 106 in a substantially horizontal direction. Preferably the controller 302 controls motion of the seat 106 in order to reduce displacement of a virtual pivot point along the reference vertical centerline 108 as the vehicle 102 is rotated (e.g., about the axis 116 in FIG. 1B). This example is advantageous in that it (a) is substantially insensitive to lateral accelerations caused by turning (when the vehicle makes a left or right turn) and gravity, and (b) requires minimal motion sensors.

If it is desired to calculate $L_1$ continuously in real time as the vehicle 102 is moving, a lateral accelerometer (not shown) can be provided on, for example, the vehicle 102 or the seat 106. It is preferable that this accelerometer is located at substantially the same height (or location) as the axis 114. The controller 302 receives inputs from the lateral accelerometer and the sensor 304, and then calculates $L_1$ using the equation $L_1$=lateral velocity/roll rate where the lateral velocity is calculated by integrating the lateral acceleration signal. It should be noted that preferably gravity correction is done on the output of any lateral accelerometers described in this application. This means that the component of gravity coupled into the lateral accelerometer as the vehicle 102 and/or seat 106 rotates is taken into consideration.

Various aspects and implementations discussed herein may also permit adjustment of a magnitude of the command signal relative to an amplitude of the input (e.g., an amplitude of the vehicle roll rate). As used herein, the magnitude of the command signal refers to the absolute value of the amplitude of a command angle of the command signal. It is appreciated that in some instances, active isolation of an occupant positioned on a vehicle seat, an occupant positioned within a wheelchair, or an occupant positioned within a neonatal incubator, may create an "unnatural" ride experience for the occupant when obstructions are encountered. For example, in contrast to a traditional vehicle seat, which does not rotate during vehicle movement, active rotation of a vehicle seat during small vehicle roll events (e.g., less than 0.25 degree of rotation of the vehicle) may be perceived by the occupant as instability or unsteadiness of the vehicle seat. As a further example, noise in the input may be misinterpreted as a rotation of the vehicle even though no obstruction has been encountered. This may result in a situation where the vehicle seat is rotated to compensate for a roll event that has not occurred. Further, it is appreciated that the "naturalness" of a vehicle seat system, or other payload suspension system, is largely dependent on the personal preferences of the occupant or user. For example, some occupants of a vehicle seat may prefer to be completely isolated from all disturbances, whereas others may prefer to be isolated from only large disturbances. In other examples, the sensitivity to movement of a particular payload (e.g., a person), is largely dependent on the characteristics of that payload. For instance, size, weight, and age, among other factors, may influence the sensitivity of the particular payload to movements of the vehicle. Accordingly, in various aspects and implementations, adjustment of a magnitude of the command signal relative to an amplitude of the input permits an active payload suspension system (e.g., vehicle seat or system) to accommodate for noise within the system, accommodate for occupant or user preferences, and correct for any "unnatural" sensations the occupant or user may experience during operation.

In various aspects, a disturbance may include a vehicle roll or pitch event. During large roll events, adjusting an amplitude of the command signal may cause the vehicle seat to roll about a roll or pitch axis to compensate for 100%, or the majority of, the vehicle roll event. As the amplitude of the disturbance decreases below a threshold, the controller may cause the vehicle seat to roll about the axis to compensate for a reduced percentage of the vehicle roll event. At very small disturbances, and when noise within the system may be interpreted as a vehicle roll event, the controller may cause the vehicle seat to roll about the axis to compensate for only a small or minimal portion of the roll event, such as 10% of the disturbance. Such aspects and implementations maintain the command signal at a stable phase as adjustment occurs, providing a more "natural" and comfortable rider experience.

Figure 4:
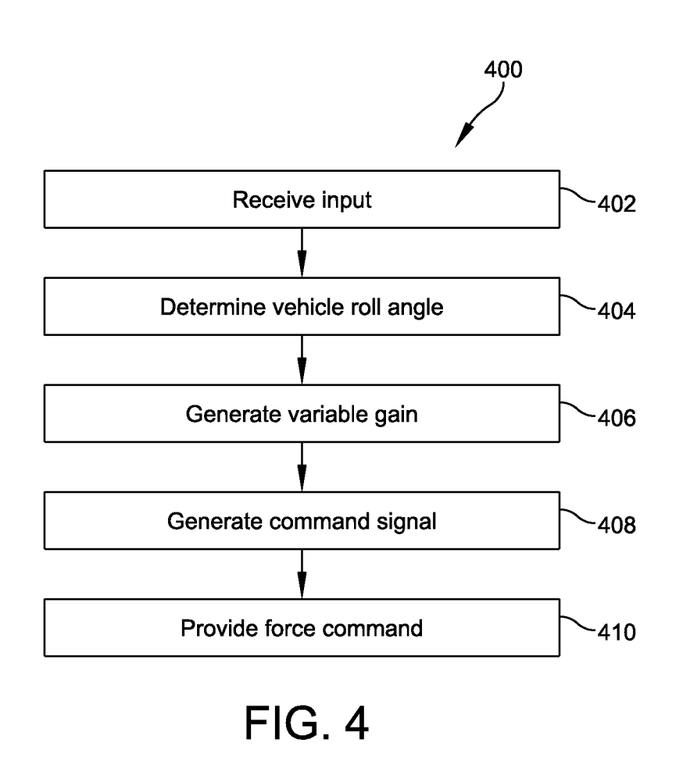
FIG. 4 is an example method of for controlling movement of a vehicle seat according to various aspects discussed herein.

At least one method for controlling seat movement in a vehicle is discussed below with reference to FIG. 4. FIG. 4 is discussed with continuing reference to the vehicle seat and vehicle seat systems described in FIGS. 1-3. In various examples, such a method may include receiving an input, determining a vehicle roll angle based at least in part on the input, generating a variable gain which modulates a gain of a band-pass filter, generating a command signal based at least in part on the input, including adjusting a magnitude of the command signal relative to an amplitude of the input, and providing a force command to an actuator to move the seat based on the command signal.

In act 402, the method 400 may include receiving an input from at least one sensor positioned to measure movement of the vehicle. For example, movement may include a vehicle roll or pitch event. In various implementations, receiving an input may include receiving a signal from a sensor that can measure movement of the vehicle about the second axis extending parallel to a direction of travel of the vehicle. In such an instance, the input includes a roll rate of the vehicle. The controller receives the input from the sensor in the form of roll rate data via a bus. Based at least on the received input, in act 404 the method may include determining a vehicle roll angle. The vehicle roll angle represents the angle between a reference vertical centerline passing through the body of the occupant positioned on the seat (e.g., centerline 108) and a vehicle centerline (e.g., vehicle centerline 124) as shown in FIG. 1B. In several implementations, determining the vehicle roll angle includes calculating the integral of the roll rate data to determine an instantaneous vehicle roll angle (shown in FIG. 1B as angle $\theta_1$).

In act 406, the method 400 may include the act of generating a variable gain based at least in part on a vehicle roll acceleration determined from the input. As used herein, the variable gain includes a variable adapted to modulate a gain of a band-pass filter having a fixed bandwidth. For instance, the variable gain of various examples is adapted to increase or decrease the gain of the band-pass filter. As described below, the band-pass filter may be applied to the command signal to adjust a magnitude of the command signal relative to an amplitude of the roll rate. In several implementations, determining the vehicle roll acceleration includes calculating the derivative of the roll rate. Generating the variable gain may further include applying a gain multiplier, filtering the roll acceleration based on a sensitivity band-pass filter having a bandwidth of payload sensitive frequencies, executing a fast attack and slow decay algorithm, and normalizing the determined roll acceleration within a predefined range, for example between 0.0 and 1.0. In several implementations, such acts generate the variable gain which appropriately adjusts the gain of the band-pass filter. For example, the variable gain may increase the gain of the filter as the amplitude of the disturbance increases. Similarly, the variable gain may decrease the gain of the filter as the amplitude of the disturbance decreases. When the roll acceleration exceeds a threshold, the gain of the filter is increased. When the roll acceleration decreases below the threshold, the gain of the filter is decreased. While described herein as generating the variable gain based at least in part on a vehicle roll acceleration, in various implementations similar processes and algorithms may be executed based on the vehicle roll rate to generate the variable gain. Such processes and algorithms may be performed by a controller, such as the controller 302 discussed above with reference to FIG. 3. Further processes for generating a variable gain are discussed below with reference to the process flow of FIG. 5.

In act 408, the method 400 may include the act of generating a command signal based at least in part on the vehicle roll angle including adjusting a magnitude of the command signal relative to an amplitude of the input. In various examples, act 408 includes applying the band-pass filter having a fixed bandwidth. The command signal may be used to instruct the actuator coupled to the seat to move the seat relative to the substantially horizontal orientation to compensate for the vehicle roll event. In various examples, applying the band-pass filter at different gain values varies the percentage of the disturbance to be compensated by movement of the vehicle seat. For instance, during large disturbances, the generated command signal may direct the actuator to move the seat to compensate for all (or most of) the disturbance. In contrast, during small disturbances, the generated command signal may direct the actuator to move the seat to compensate for a fraction (e.g., 10%) of the disturbance. Such an implementation avoids any undesirable effects of noise within the system during small disturbances. In various implementations, generating the command signal includes multiplying the variable gain and the vehicle roll angle. In further implementations, the method 400 may include applying a pre-multiply compensator and a post-multiply compensator. Such methods are further described with reference to the process flow of FIG. 5.

In act 410, the method 400 may include the act of providing a force command to the actuator to move the seat based on the command signal. As discussed above, the actuator can induce roll (and/or pitch) into the vehicle seat, or a support structure attached to the vehicle seat, to compensate for the roll or pitch of the vehicle during a roll or pitch event. The force command causes the actuator to rotate the seat by the angle $\theta_2$, which is the angle between the vehicle centerline (e.g., centerline 124) and a seat centerline (e.g., centerline 126). In particular, electrical energy generated by the controller is delivered to the actuator causing the actuator to extend or retract to a predetermined position causing the seat to rotate. As discussed above, the linear actuator can be, for example, an electromagnetic linear motor, a hydraulic cylinder, or a pneumatic cylinder. The linear actuator instead may also be some other type of actuator such as a rotary actuator (electromagnetic, hydraulic, or pneumatically powered) that is coupled between the seat and the floor of the vehicle.

Figure 5:
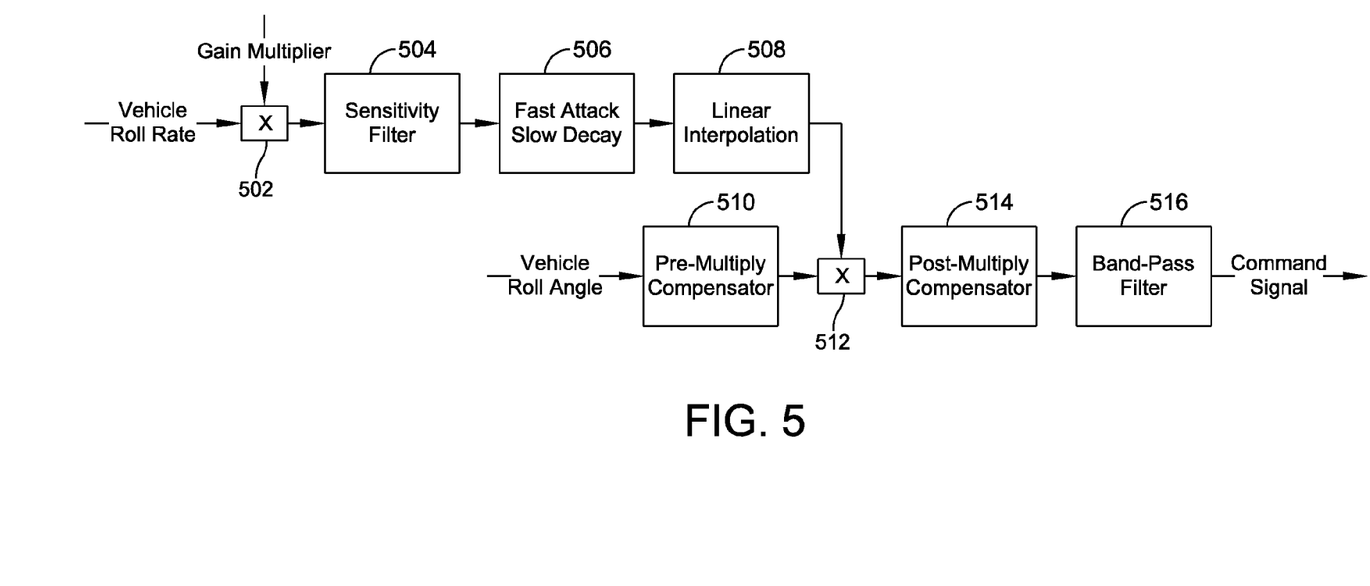
FIG. 5 is an example process flow for generating a command signal according to various aspects discussed herein.

Turning to FIG. 5, shown is one example of a block diagram for generating a command signal for instructing movement of an active payload suspension system, such as the vehicle seat and systems described above with reference to FIGS. 1-3. FIG. 5 is described with continuing reference to FIGS. 1-4.

As discussed above with reference to FIGS. 1-4, the controller may receive an input from at least one sensor positioned to measure movement of the vehicle. In one implementation, the input includes the vehicle roll rate about a first axis extending parallel to a direction of travel of the vehicle. In further implementations, the vehicle roll rate may include any aspect of motion of the vehicle measured by one or more sensors of the vehicle seat system. The controller may also receive an input (e.g., sensitivity input) from a user corresponding to a gain multiplier to be applied to the input from the sensor. The sensitivity input may be received from one or more user input devices coupled with the controller, such as a keyboard, mouse device, trackball, microphone, touch screen, printing device, display screen, button, switch, or dial. In various implementations the controller adjusts the sensitivity of the system or seat to disturbances by adjusting the gain of the input proportionate to the gain multiplier. This may include multiplying the gain multiplier by the input.

As shown at block 502 of FIG. 5, in one implementation the controller multiplies the vehicle roll rate by the gain multiplier. In various implementations, the sensitivity input may be selected by the user from a range of values corresponding to a dynamic range of gain multipliers. For example, the sensitivity input may include a range of values corresponding to a dynamic gain multiplier range of 3:1. In various other implementations, any suitable range of gain multipliers may be used. While in various implementations the gain multiplier may be determined responsive to a user sensitivity input, in various other implementations the controller may be configured to automatically and/or dynamically determine the gain multiplier. For example, the controller may be configured to determine the gain multiplier based on a pre-set value, the operating conditions of the vehicle seat system, a previously provided sensitivity input, or a speed of the vehicle. In one implementation, a speed sensor such as a global positioning system (GPS) is configured to measure the rate of travel of the vehicle over a given distance. The controller may perform one or more runtime calculations to determine a particular gain multiplier to be applied to the vehicle roll rate based on the measured speed of the vehicle. In other examples, the controller may use a look-up table to determine the particular gain multiplier based on the speed of the vehicle. The gain multiplier look-up table may include any array that replaces a runtime computation with an indexing operation. For example, the actuator position look-up table may include an array of pre-calculated and indexed multipliers stored in static program storage. In one example, the controller is configured to increase the gain multiplier applied as the speed of the vehicle increases, and decrease the gain multiplier applied as the speed of the vehicle decreases. However, in other examples, the gain multiplier may be increased as the speed of the vehicle decreases and decreased as the speed of the vehicle increases.

At block 504, the controller is configured to determine a vehicle roll acceleration based at least on the vehicle roll rate. As discussed herein, in one implementation the controller differentiates the roll rate to determine the roll acceleration. The controller may also be configured to apply one or more sensitivity filters to further increase or decrease the sensitivity of the system to roll events. In particular, block 504 shows the controller applying a sensitivity band-pass filter having a band-pass of payload sensitive frequencies. As used herein, payload sensitive frequencies may include those frequencies to which the payload is sensitive. For instance, in an implementation wherein the payload includes an occupant of a vehicle seat, the sensitivity function may correlate the roll acceleration with a frequency range of 0.2 Hz to 5.0 Hz. However, in various other implementations other frequency ranges may be used, and may largely depend on the characteristics of the payload (e.g., size, weight, age, etc.). In various examples, the controller is configured to output the absolute value of the result of the processes performed at block 504. Accordingly, processes performed by the controller at blocks 506 and 508 treat positive and negative values (e.g., vehicle roll accelerations) similarly.

At block 506, the controller is configured to further process the vehicle roll acceleration. For example, block 506 shows the controller as executing a fast attack and slow decay algorithm. At block 506, the controller compares a previously generated value of the roll acceleration (i.e., an output) to a current value of the roll acceleration (i.e., an input). If the input is larger than the output at any instant in time, the output is increased to be equal to the input. As discussed herein, this is referred to as "fast attack." If the input is less than the output, the output is gradually decreased. As discussed herein, this is referred to as "slow decay." As noted above, operations performed at block 504 include determining the absolute value of the roll acceleration. Accordingly, the fast attack and slow decay algorithm responds to positive and negative roll accelerations in the same manner. In other examples, at block 506 the controller may apply one or more other filters, such as a filter applying an RMS calculation. Such implementations may gradually increase the system sensitivity.

At block 508, the controller is configured to normalize the roll acceleration. In various examples, this includes normalizing the roll acceleration within a range of substantially 0.0 to 1.0. At block 508, the controller is configured to apply an upper threshold and a lower threshold. If the roll acceleration exceeds the upper threshold, the controller is configured to generate and set the variable gain at a maximum value. Similarly, if the roll acceleration is less than a lower threshold, the controller is configured to generate and set the variable gain at a minimum value. For instance, the variable gain below the lower threshold may be 0.1, and the variable gain above the upper threshold may be 1.0. Between the upper and lower threshold, the controller is configured to fit a curve to the roll acceleration to generate and set the variable gain. In various examples, this may include linearly interpolating between the maximum value and the minimum value if the roll acceleration is equal to, or between, the upper threshold and the lower threshold. While in one example, the thresholds may be set to 0.1 and 1.0, in various other implementations other values may be used, such as 0.5 and 1.0. The generated variable gain is applied to the vehicle roll angle as further described below at block 512.

As shown in FIG. 5 at block 510, the controller may also be configured to apply a pre-multiply compensator to a determined vehicle roll angle, and at block 514, the controller may be configured to apply a post-multiply compensator. In various implementations, the vehicle roll angle may be determined by the controller by calculating the integral of the roll rate data, as described above with reference to act 404 of FIG. 4. The pre-multiply compensator may be a perfect complement to a post-multiply compensator (i.e., pre-multiply compensator*post-multiply compensator=1.0). Accordingly, the pre-multiply compensator and post-multiply compensator generate a smooth command signal removing any undesirable frequency responses in the command signal. The pre-multiply compensator and post-multiply compensator alter the phase characteristics of the command signal without altering the magnitude characteristics. In at least one implementation, the pre-multiply compensator includes a broad differentiator and the post-multiply compensator includes a broad integrator. Responsive to applying the pre-multiply compensator, at block 512 the controller is configured to multiply the variable gain and the vehicle roll angle. In at least one implementation, the vehicle roll angle is scaled in incremental vehicle motions. The pre-multiply compensator and post-multiply compensator of at least one implementation "re-assemble" the incremental motions and ensure a smooth command signal.

At block 516, the controller is configured to generate the command signal and adjust a magnitude of the command signal. In various implementations, this includes applying a band-pass filter having a fixed bandwidth. In various examples, the band-pass filter has a fixed bandwidth of 0.2 Hz to 20 Hz; however, in various other implementations any suitable bandwidth may be used. In particular, the bandwidth may be selected to represent the bandwidth of signals to which a payload (e.g., an occupant) is most sensitive. Applying a band-pass filter having a fixed bandwidth and, accordingly, fixed breakpoints, permits modulation of the gain of the filter, at a fixed phase relationship to the command signal. That is, in at least one implementation, the phase relationship of the command signal relative to the input does not change while the magnitude is being adjusted relative to the amplitude of the input. It is appreciated that a phase offset between the command signal and vehicle roll rate may further increase the "unnatural" feeling of movements of the vehicle seat system. Accordingly, in various implementations, it is advantageous to maintain a stable phase relationship of the command signal relative to the vehicle roll angle input.

In one example, the command signal is generated according to:

$$\theta_1 + \left(\frac{L_1}{L_2}\right)\ddot{\theta}_1,$$

in which, $\theta_1$ is the vehicle roll angle, $L_2$ is the distance between the pivot and a substantially center of the head of the occupant, and $L_1$ is a distance between the first axis and the second axis 116. In various implementations, the variable gain modulates the gain of the band-pass filter such that the magnitude of the command signal is relative to the amplitude of the disturbance causing rotation of the vehicle. In various implementations, this includes increasing or decreasing the gain of the band-pass filter. For instance, in one implementation the variable gain may increase the gain of the band-pass filter which causes the response magnitude of the command signal to increase. In another implementation, the variable gain may decrease the gain of the band-pass filter, which causes the response magnitude of the command signal to decrease. Since the variable gain is largely dependent on the rotation of the vehicle, various examples have the effect of minimizing the undesirable effects of noise within the system and providing a more "natural" and enjoyable riding experience. In further examples, applying a gain multiplier to the vehicle roll acceleration has the effect of increasing or decreasing the variable gain and, accordingly, increasing or decreasing the gain of the band-pass filter. Such an implementation personalizes the responsiveness of the vehicle seat to disturbances in travel. Responsive to generating the command signal and applying the band-pass filter, the controller is configured to output the command signal, and in some implementations, generate a force command based on the command signal, as described above.

Figure 6:
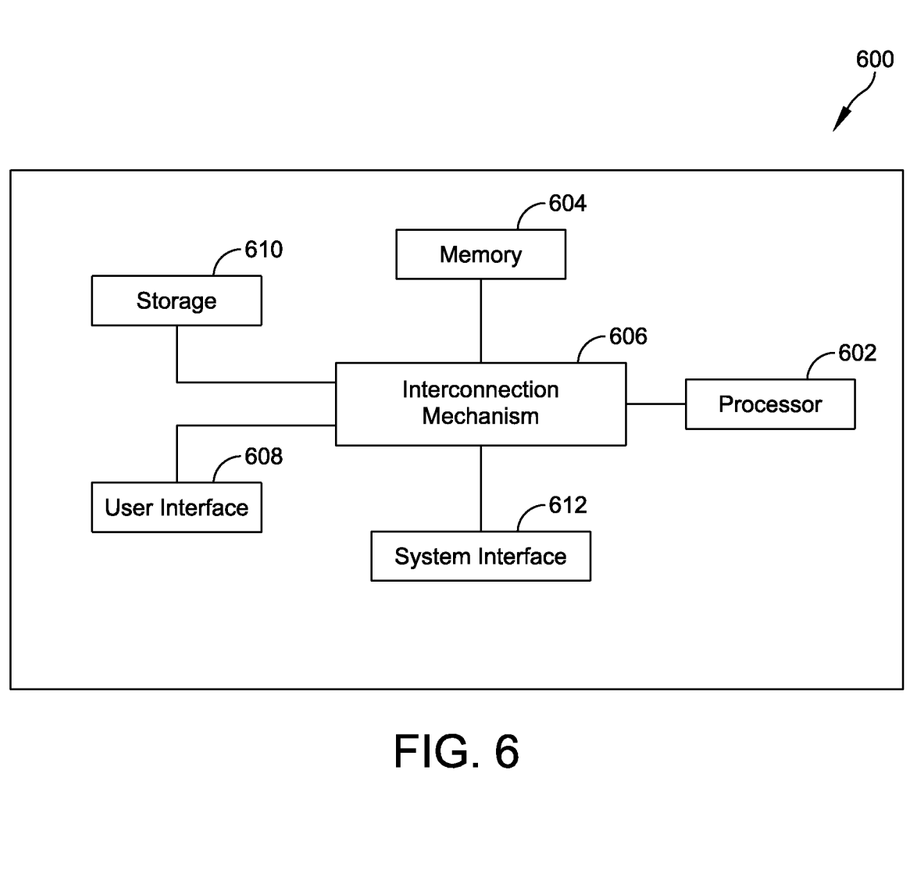
FIG. 6 is an illustration of a controller that may be used with various aspects discussed herein.

Referring to FIG. 6, there is illustrated a block diagram of a controller 600, in which various aspects and functions are practiced. FIG. 6 is described with reference to the several aspects and implementations discussed above with reference to FIGS. 1-5. For example, the controller 600 may include the controller 302 shown in FIG. 3. As shown, the controller 600 can include one or more system components that exchange information. More specifically, the controller 600 can include at least one processor 602, a power source (not shown), a data storage 610, a system interface 612, a user interface 608, a memory 604, and one or more interconnection mechanisms 606. The controller 600 may also include a power source (not shown) that provides electrical power to other components. The at least one processor 602 may be any type of processor or multiprocessor, and for example may include a digital signal processor. The at least one processor 602 is connected to the other system components, including one or more memory devices 604 by the interconnection mechanism 606. The system interface 612 couples one or more sensors or components (e.g., actuator 210) to the at least one processor 602.

The memory 604 stores programs (e.g., sequences of instructions coded to be executable by the processor 602) and data during operation of the controller 600. Thus, the memory 604 may be a relatively high performance, volatile, random access memory such as a dynamic random access memory ("DRAM") or static memory ("SRAM"). However, the memory 604 may include any device for storing data, such as a disk drive or other nonvolatile storage device. Various examples may organize the memory 604 into particularized and, in some cases, unique structures to perform the functions disclosed herein. These data structures may be sized and organized to store values for particular data and types of data.

Components of the controller 600 are coupled by an interconnection mechanism such as the interconnection mechanism 606. The interconnection mechanism 606 may include any communication coupling between system components such as one or more physical buses. The interconnection mechanism 606 enables communications, including instructions and data, to be exchanged between system components of the controller 600.

The controller 600 can also include one or more user interface devices 608 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the controller 600 to exchange information and to communicate with external entities, such as users and other systems.

The data storage element 610 includes a computer readable and writeable data storage medium configured to store non-transitory instructions and other data, and can include both nonvolatile storage media, such as optical or magnetic disk, ROM or flash memory, as well as volatile memory, such as RAM. The instructions may include executable programs or other code that can be executed by the at least one processor 602 to perform any of the functions described here below.

Although not illustrated in FIG. 6, the controller 600 may include additional components and/or interfaces, such as a communication network interface (wired and/or wireless), and the at least one processor 602 may include a power saving processor arrangement.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of controlling seat movement in a vehicle, comprising:
   receiving an input from at least one sensor positioned to measure movement of the vehicle;
   determining a vehicle roll angle based at least in part on the input;
   generating a variable gain based at least in part on a vehicle roll acceleration determined from the input, wherein the variable gain modulates a gain of a band-pass filter having a fixed bandwidth;
   generating a command signal based at least in part on the vehicle roll angle, including adjusting a magnitude of the command signal relative to an amplitude of the input, wherein generating the command signal includes applying the band-pass filter; and
   providing a force command to the actuator to move the seat about a first axis of a pivot at a command angle based on at least the command signal.

2. The method of claim 1, wherein receiving an input from at least one sensor includes receiving a vehicle roll rate from a sensor positioned to measure rotation of the vehicle about a second axis extending parallel to a direction of travel of the vehicle.

3. The method of claim 2, wherein generating a command signal includes multiplying the variable gain and the vehicle roll angle.

4. The method of claim 2, wherein generating the variable gain includes differentiating the vehicle roll rate to determine the vehicle roll acceleration.

5. The method of claim 4, wherein generating the variable gain includes normalizing the roll acceleration within a range of substantially 0.0 to 1.0, and wherein the variable gain is set to a maximum value if the roll acceleration is greater than an upper threshold, the variable gain is set to a minimum value if the roll acceleration is less than a lower threshold, and the variable gain is linearly interpolated between the maximum value and the minimum value if the roll acceleration is equal to or between the upper threshold and the lower threshold.

6. The method of claim 2, wherein generating the command signal includes applying a pre-multiply compensator to the vehicle roll angle and applying a post-multiply compensator to the vehicle roll angle.

7. The method of claim 6, wherein the pre-multiply compensator and post-multiply compensator include perfect compliments.

8. The method of claim 1, wherein generating a variable gain based at least in part on a vehicle roll acceleration determined from the input includes band-pass filtering the input with a sensitivity band-pass filter having bandwidth of payload sensitive frequencies.

9. The method of claim 1, wherein generating the variable gain includes applying a gain multiplier to the vehicle roll rate.

10. A seat system for a vehicle, comprising:
    a seat;
    a support structure coupled to the seat and including an actuator configured to move the seat about a first axis of a pivot at a command angle;
    at least one sensor positioned to detect movement of the vehicle; and
    a controller configured to:
      receive an input from the at least one sensor,
      determine a vehicle roll angle based at least in part on the input,
      generate a variable gain based at least in part on a vehicle roll acceleration determined from the input, wherein the variable gain modulates a gain of a band-pass filter having a fixed bandwidth,
      generate a command signal based at least in part on the vehicle roll angle, the controller being configured to adjust a magnitude of the command signal relative to an amplitude of the input and apply the band-pass filter, and
      provide a force command to the actuator to move the seat at a desired command angle based on the command signal.

11. The seat system of claim 10, wherein the sensor is positioned to measure movement of the vehicle about a second axis extending parallel to a direction of travel of the vehicle, and the input includes a vehicle roll rate.

12. The seat system of claim 11, further configured to generate the command signal by multiplying the variable gain and the vehicle roll angle.

13. The seat system of claim 11, wherein the controller is configured to differentiate the vehicle roll rate to determine the vehicle roll acceleration.

14. The seat system of claim 13, wherein the controller is further configured to normalize the roll acceleration within a range of substantially 0.0 to 1.0, and further configured to set the variable gain to a maximum value if the roll acceleration is greater than an upper threshold, set the variable gain to a minimum value if the roll acceleration is less than a lower threshold, and linearly interpolate the variable gain between the maximum value and the minimum value if the roll acceleration is equal to or between the upper threshold and the lower threshold.

15. The seat system of claim 11, wherein the controller is further configured to apply a pre-multiply compensator to the vehicle roll angle and a post-multiply compensator to the vehicle roll angle.

16. The seat system of claim 15, wherein the pre-multiply compensator and post-multiply compensator include perfect compliments.

17. The seat system of claim 11, wherein the controller is configured to band-pass filter the input with a sensitivity band-pass filter having a band-pass of payload sensitive frequencies.

18. The seat system of claim 11, wherein the controller is further configured to apply a gain multiplier to the vehicle roll rate.

19. A vehicle seat, comprising:
a seat configured to move at a command angle about a first axis of a pivot relative to a substantially horizontal orientation; and
a controller configured to:
receive an input of detected movement of the vehicle,
determine a vehicle roll angle based at least in part on the input,
generate a variable gain based at least in part on a vehicle roll acceleration determined from the input, wherein the variable gain modulates a gain of a band-pass filter having a fixed bandwidth,
generate a command signal based at least in part on the vehicle roll angle, the controller being configured to adjust a magnitude of the command signal relative to an amplitude of the input and apply the band-pass filter, and
provide a force command to the actuator to move the seat at a desired command angle based on at least the command signal.

20. The vehicle seat of claim 19, wherein the input includes a vehicle roll rate.

21. The vehicle seat of claim 20, wherein the controller is configured to generate the command signal by multiplying the variable gain and the vehicle roll angle.

22. The vehicle seat of claim 20, wherein the controller is configured to differentiate the vehicle roll rate to determine the vehicle roll acceleration.

23. The vehicle seat of claim 22, wherein the controller is configured to normalize the roll acceleration within a range of substantially 0.0 to 1.0, and further configured to set the variable gain to a maximum value if the roll acceleration is greater than an upper threshold, set the variable gain to a minimum value of the roll acceleration is less than a lower threshold, and linearly interpolate the variable gain between the maximum value and the minimum value if the roll acceleration is equal to or between the upper threshold and the lower threshold.

24. The vehicle set of claim 21, wherein the controller is further configured to apply a pre-multiply compensator to the vehicle roll angle and a post-multiply compensator to the vehicle roll angle.

25. The vehicle seat of claim 24, wherein the pre-multiply compensator and post-multiply compensator include perfect compliments.

26. The vehicle seat of claim 19, wherein the controller is configured to band-pass filter the input with a sensitivity filter having a bandwidth of payload sensitive frequencies.

27. The vehicle seat of claim 19, wherein the controller is further configured to apply a gain multiplier to the vehicle roll rate.

* * * * *